(12) United States Patent
Helbing et al.

(10) Patent No.: US 6,735,328 B1
(45) Date of Patent: May 11, 2004

(54) PERSONAL VIEWING DEVICE WITH SYSTEM FOR PROVIDING IDENTIFICATION INFORMATION TO A CONNECTED SYSTEM

(75) Inventors: Rene P. Helbing, Palo Alto, CA (US); Richard C. Walker, Palo Alto, CA (US); Pierre Mertz, Mountain View, CA (US); Barry Bronson, Saratoga, CA (US); Ken A. Nishimura, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/519,712

(22) Filed: Mar. 7, 2000

(51) Int. Cl.[7] ................................................. G06K 9/00
(52) U.S. Cl. ........................................ 382/117; 345/8
(58) Field of Search ........................... 382/117; 356/71; 340/5.52, 5.53, 5.82, 5.83; 345/7–9

(56) References Cited

U.S. PATENT DOCUMENTS

| | | | |
|---|---|---|---|
| D50,385 S | * 2/1917 | Heckroth | D16/302 |
| 5,162,828 A | * 11/1992 | Furness et al. | 53/122 |
| 5,359,669 A | 10/1994 | Shanley et al. | 382/6 |
| 5,886,822 A | 3/1999 | Spitzer | 359/630 |
| 5,929,474 A | * 7/1999 | Huang et al. | 257/292 |
| 5,982,555 A | 11/1999 | Melville et al. | 359/630 |
| 6,309,069 B1 | * 10/2001 | Seal et al. | 351/221 |
| 6,333,988 B1 | * 12/2001 | Seal et al. | 382/117 |
| 6,369,953 B2 | * 4/2002 | Melville et al. | 359/630 |
| 6,408,257 B1 | * 6/2002 | Harrington et al. | 702/150 |
| 6,445,489 B1 | * 9/2002 | Jacobson et al. | 359/296 |

FOREIGN PATENT DOCUMENTS

| | | | |
|---|---|---|---|
| DE | 19654591 A1 | 12/1995 | G02B/5/32 |
| WO | WO 93/14454 A1 | 7/1993 | G06F/3/00 |
| WO | WO 98/05992 A2 | 2/1998 | G02B/27/01 |

* cited by examiner

*Primary Examiner*—Brian Werner

(57) ABSTRACT

A personal display system having an ocular scan unit for generating user identification information and an interface for conveying user identification to a connected system.

19 Claims, 3 Drawing Sheets

PERSONAL VIEWING DEVICE WITH SYSTEM FOR PROVIDING IDENTIFICATION INFORMATION TO A CONNECTED SYSTEM

TECHNICAL FIELD

The present invention is generally related to a personal display system. More particularly, the present invention relates to a personal display system incorporating an ocular detection sensor for generating user identification data.

BACKGROUND OF THE INVENTION

Computer systems provide a user with access to information and display imagery. It is common for access to certain types of information to be limited by a system to only certain persons (users). An example is that of an automated bank teller machine (ATM) where the user is granted access and permitted to withdraw money only after presenting identification information via an ATM card and password entry. Another example is that of a computer in which user preferences, as well as file/information or access, is presented based upon the identity of the user as presented by the user through the input of the user name and password. The user name and password are then recognized by the system and used to invoke certain predefined user preferences unique to that particular user name and password.

Other techniques have included the use of fingerprint recognition sensors that can be used to identify a particular party via an input of their scanned, or imaged, fingerprint. Yet other techniques have provided for optical scanning of the user's retina by looking into a dedicated eyepiece attached to a system that senses the unique characteristics of the user's retina.

As each of these systems and techniques requires the user to make a special effort to enter, or provide the required identification input to the requesting system, they do not lend themselves to applications in which the user's activities are best not interrupted, or disturbed for purposes of providing necessary identification input. Thus, there is a need for a system and technique of providing necessary user identification to a requesting system with less overt or disruptive efforts required on the part of the user to provide such information to the system.

The present invention provides for a personal display system that incorporates an optical scan system for scanning the user's retina and outputting identification information to a connected system which requires users to identify themselves to the system.

SUMMARY OF THE INVENTION

The present invention provides an apparatus and technique for providing unique user identification information to a connected system that requires such unique identification information.

Briefly described, in architecture, the system can be implemented as follows. The present invention incorporates a personal viewing device and an optical scanning unit for imaging attributes of the user's eye to generate identification information. There is also provided an interface unit that provides the identification information to a requesting system.

The present invention can also be viewed as providing a method for providing identification information to a connected system that requires such identification information. In this regard, the method can be broadly summarized by the following steps: scanning attributes of the user's eye; generating identification data and providing the identification data to a connected system.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
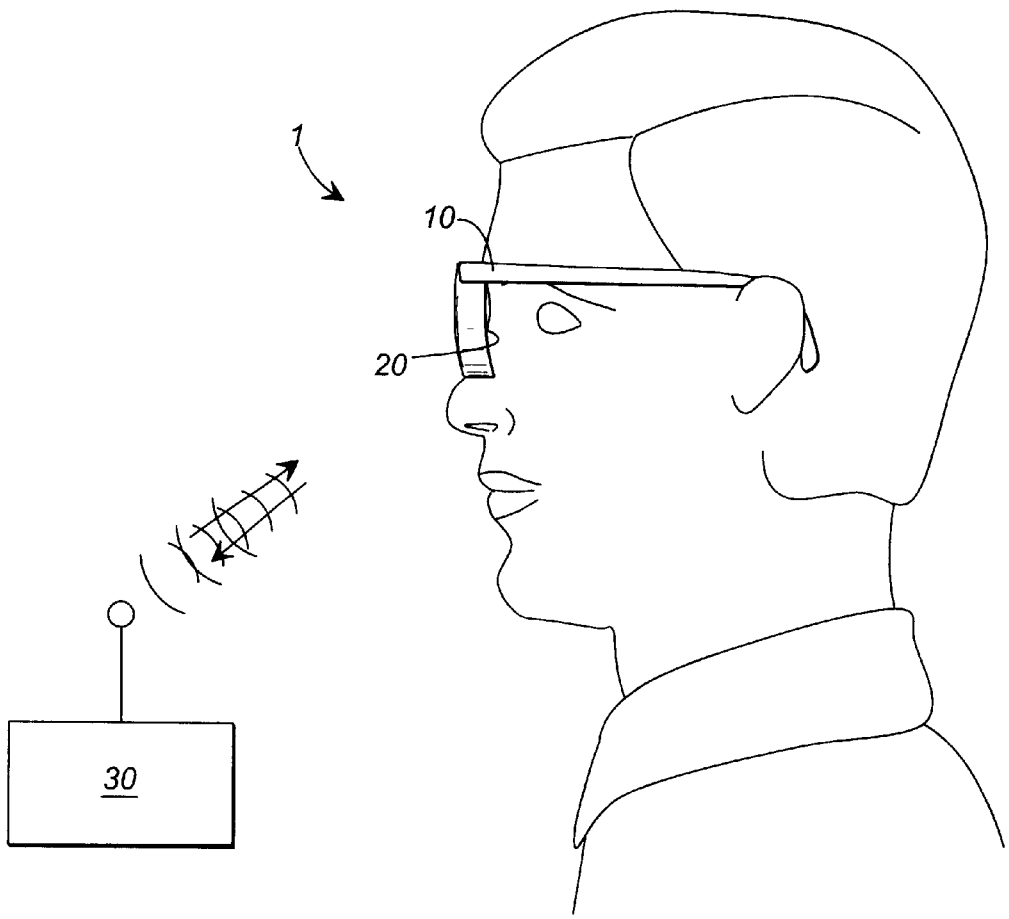
FIG. 1 is a diagram illustrating the present invention and a connected system.
Figure 2:
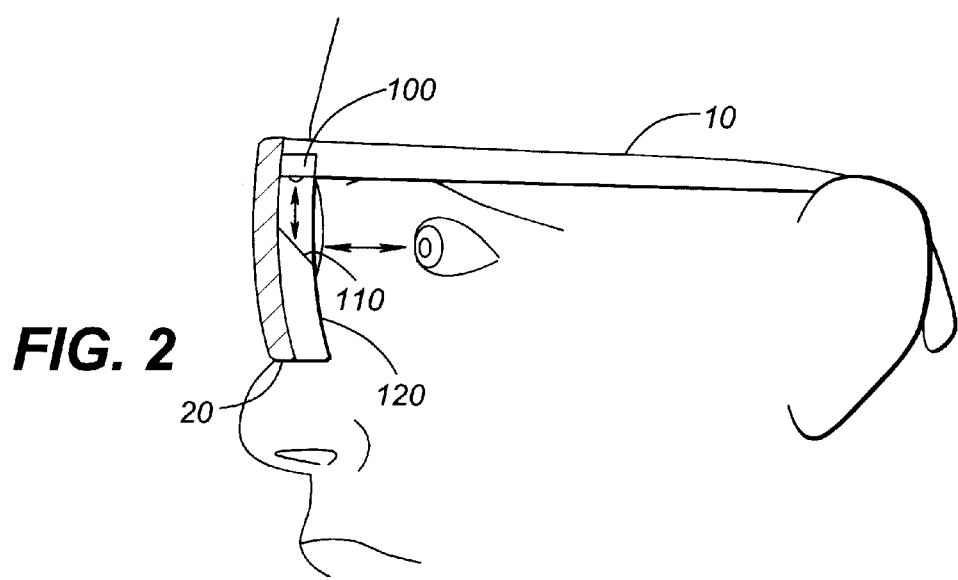
FIG. 2 is a diagram illustrating ocular scan unit and beam splitter.
Figure 3:
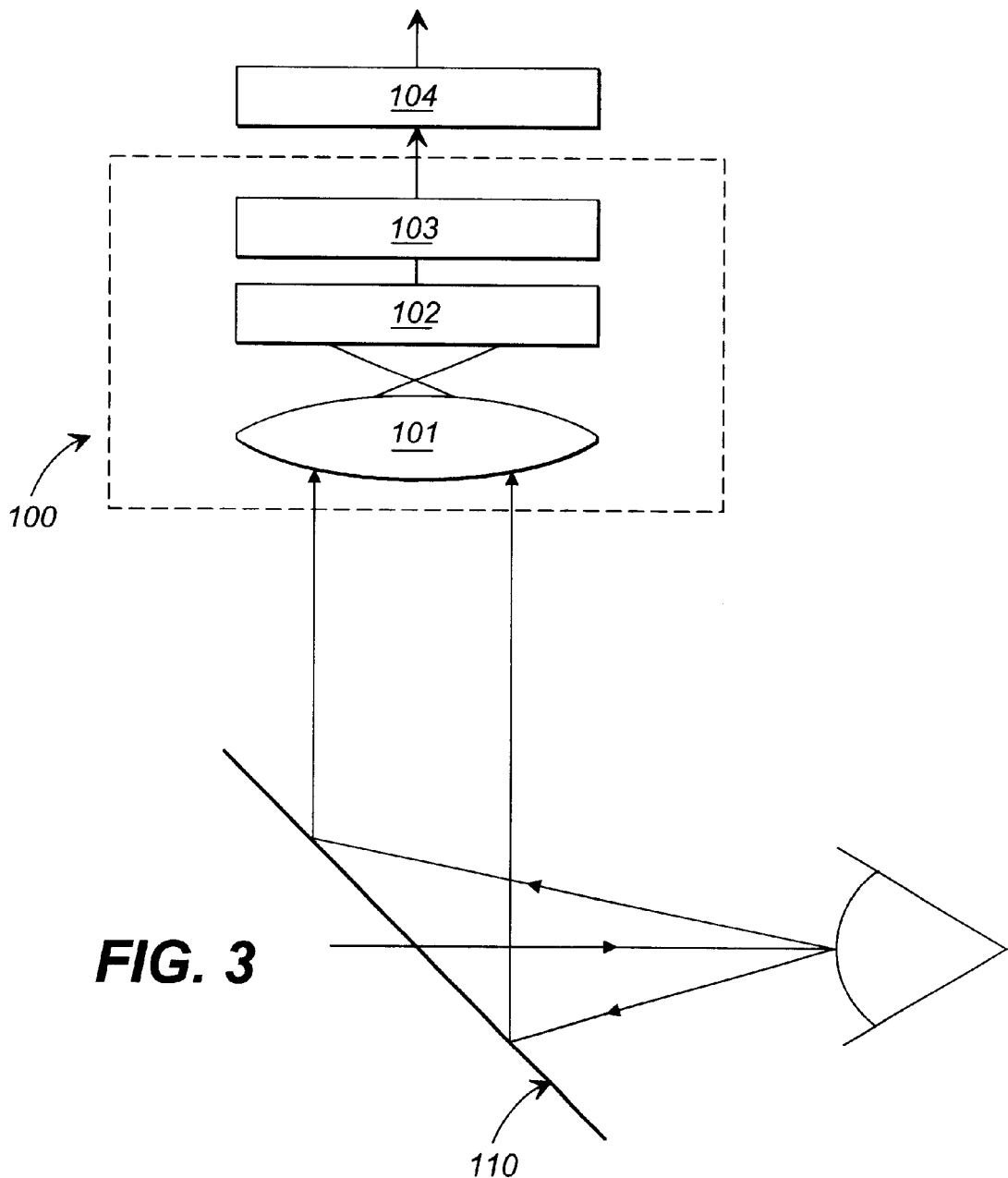
FIG. 3 is a block diagram illustrating ocular scan unit.

The present invention provides for a personal display system that incorporates an optical scan system for scanning the user's retina and outputting identification information to a requesting system. FIG. 1 and FIG. 2 illustrate one aspect of the present invention. Display device 1 includes a headset 10 that supports a display surface 20 so that it is positioned in front of, and within close proximity to, the user's eye. Display surface 20 displays images generated via a connected system 30, for viewing by the user. Connected system 30 is interfaced (or connected) to personal display device 1 via interface unit 104 (FIG. 3). Interface unit 104 may be implemented as either a wired, or wireless transmission system for exchanging data between personal display device 1 and connected system 30.

FIG. 3 is another illustration of the present invention. Here, an ocular scan unit 100 is provided for scanning (imaging) attributes of the user's eye via beam splitter 110. Beam splitter 110 is preferably transparent to the user's vision and thus does not obstruct the user's view of images displayed on, or through, display surface 20. Beam splitter 110 is positioned so as to substantially optically align ocular scan unit 100 with the eye of the user. While the user views imagery displayed on display surface 20 (FIG. 1), light is reflected from the user's eye, and is passed via beam splitter 110 to ocular scan unit 100.

With regard to the attributes of the user's eye, which is subjected to imaging by ocular scan unit 100, it will be noted that there are several attributes of the user's eye which may be imaged. More particularly, the retina of the user's eye, for example, could be the attribute imaged by ocular scan unit 100. Further, as an additional example, the iris of the user's eye could also be the attribute which ocular scan unit 100 images. Those skilled in the art will understand and appreciate that ocular scan unit 100 will necessarily have to be adapted to image the particular eye attribute that is chosen for purposes of imaging. In other words, if, for example, the iris is to be the chosen eye attribute to be scanned for extracting identification information, then ocular scan unit 100 must be configured to image and derive identification information from the iris of the user's eye.

FIG. 3 illustrates ocular scan unit 100. There is provided an imager 102 for scanning the user's eye and generating an output signal in accordance therewith, an optical system 101 for focusing light reflected from the user's eye onto imager 102, and scan interpreter 103 for generating identification data in accordance with the output signal generated by imager 102. Identification data is provided to a requesting system via interface unit 104. Imager 102 is preferably a complementary metal oxide semiconductor (CMOS) photo imager 102, however, other imaging devices such as a charge-coupled device (CCD), photo diode array or photo transistor array may also be used. Scan interpreter 103 is preferably a digital signal processing (DSP) device. However, it may also be implemented, for example, as an application specific integrated circuit (ASIC), or a series of digital logic gates.

Interface unit 104 sends and receives data to and from a requesting system. Interface 104 may receive and provide this information via, for example, a wireless transmission system. Some examples of applicable wireless transmission systems include, but are not limited to, radio frequency or infrared wireless transmission systems. Of course, interface unit 104 can also be implemented so as to send and receive data to and from a requesting system via a wired system.

Display surface 20 is preferably an organic light emitting diode (OLED) array, liquid crystal display (LCD) device or plasma addressed liquid crystal device (PALC). However, it will be recognized and understood that any display means could be implemented as display surface 20, provided it allows the user to view images displayed thereon. Further, display surface 20 could be the surface of a lens such as, for example, that used to correct a user's personal vision deficiencies or otherwise enhance the user's vision.

Figure 4:
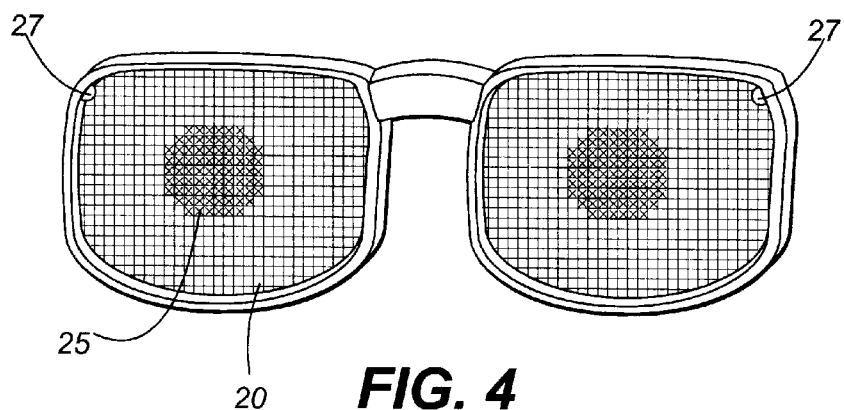
FIG. 4 is a diagram illustrating an implementation of a display surface incorporating active pixels.

FIG. 4 illustrates an implementation of display surface 20, wherein imager 102 of ocular scan unit 100 is incorporated as a plurality of active pixels 25 within the display surface 20. Active pixels 25 are configured so as to be optically aligned with the user's eye and provide for imaging of the user's eye between successive frames of imagery displayed on display surface 20. In other words, active pixels 25 alternate between outputting light during successive frames of imagery, and detecting (or capturing) light reflected from the user's eye between successive frames of imagery. Active pixels 25 are preferably implemented as organic light emitting diodes. An illuminator 27 directs light to the user's eye which is reflected and then captured by active pixels 25. Illuminator 27 is preferably a light emitting diode (LED).

Figure 5:
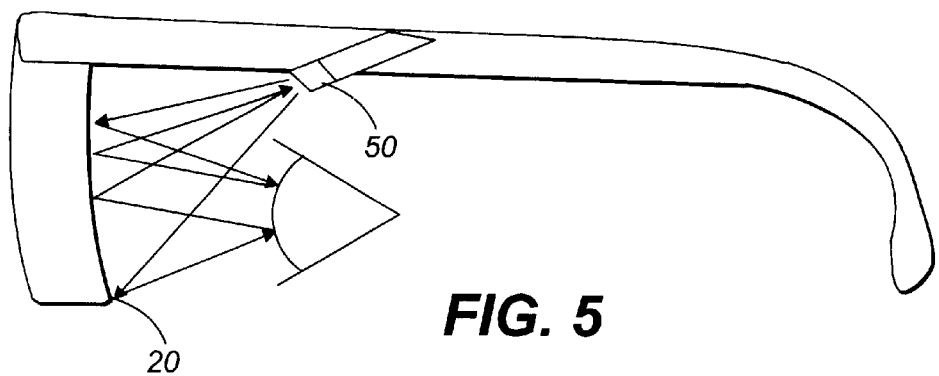
FIG. 5 is a diagram illustrating an embodiment of the present invention incorporating an image projector.
Figure 6:
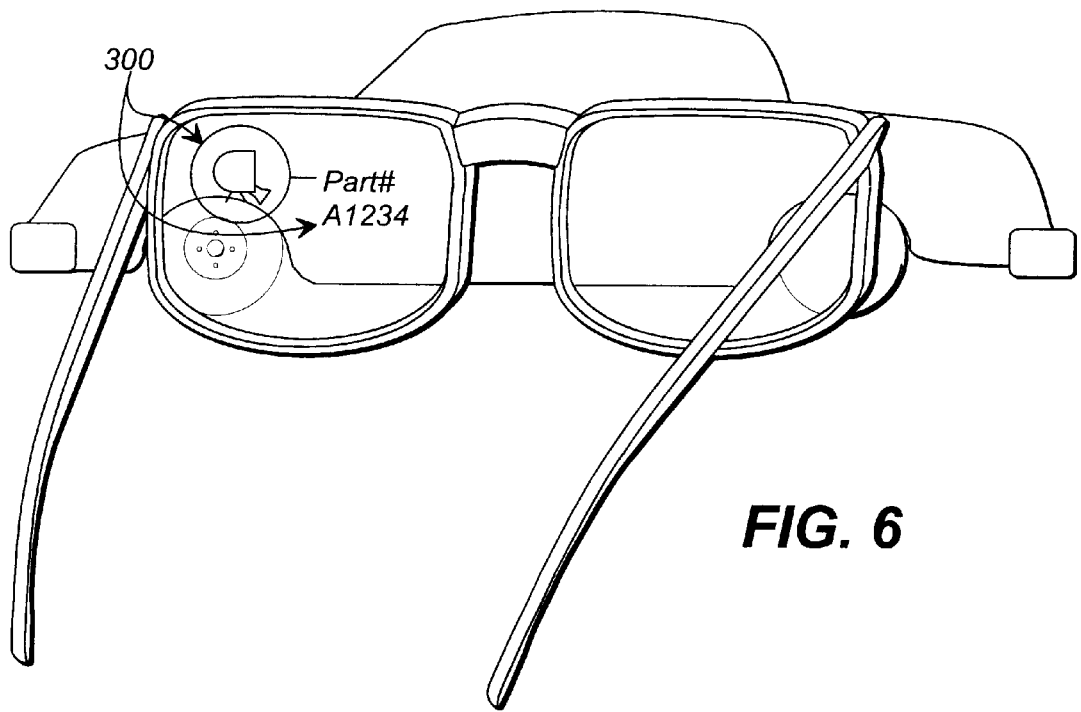
FIG. 6 is a diagram illustrating a display surface with supplementary imagery projected thereon.

In a further embodiment shown as FIG. 5 and FIG. 6, display surface 20 is the surface of a lens and personal display device 1 is configured to include an image projector 50, which projects overlay imagery generated by a connected system 30 onto the display surface 20 to allow for augmented viewing by the user.

In this embodiment, the user is able to see and view normally through the lens that comprises display surface 20. However, in addition, the user is presented with imagery projected onto the lens surface that constitutes display surface 20, thereby allowing the user to view, not only through the lens, but also the imagery projected, or layered, on top thereof FIG. 6 illustrates an example of a lens having imagery projected thereon to augment the user's view. In this illustration, imagery 300 is provided to highlight a part of an automobile that is being viewed through the display surface 20. There is also provided imagery indicating the nature of the highlighted part as being "PART# A1234". This embodiment could be used, for example, in helping an auto or aircraft mechanic easily identify a particular part by providing imagery projected onto the lens surface that constitutes display surface 20 to highlight the part for the mechanic. Depending, for example, upon the mechanic's identification information, he/she could then be provided with projected imagery that gives information relevant to, for example, his/her job assignment relative to the highlighted part. It will be recognized that the present invention has many applications outside the auto or aircraft maintenance field and can also be utilized, for example, in surgical or medical environments, as well as virtual reality systems and the like.

In use, the present invention allows the user to provide necessary identification information to a connected system that requires such. Such connected systems could include, security access devices, real-world simulation devices or augmented imagery generation devices. For example, where the present invention is incorporated as a display for a computer system, and display surface 20 provides the user with the visual display of, for example, files in the computer directory that require password or identification authorization to access, the interface unit 104 receives a request for identification from the system. Subsequently, the ocular scan unit 100 causes the user's eye to be imaged via imager 102. The imager 102 then provides this image information to the identification data generator 103, which generates unique identification information in accordance with the image produced by imager 102. The identification information is then transmitted to the connected system 30 via interface unit 104. The connected system 30 responds by granting access to the files without requiring the user to interrupt his/her activities to provide (input) the identification information.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiment(s) of the invention without departing substantially from the principles of the invention. All such modifications and variations are intended to be included herein within the scope of the present invention and protected by the following claims.

We claim:

1. A personal display system, comprising:

a headset;

a transparent optical display surface carried on said headset; and an ocular scan unit comprising:

an imager for imaging an attribute of a user's eye and generating an output signal;

an identification information generator for generating identification data that identifies a user in response to said output signal from said imager; and logic responsive to the identification data of the identification information generator for displaying user-dependent information on the display surface, the displayed user-dependent information being viewable on the display surface as overlayed with objects viewable by the user though the display surface.

2. The personal display system of claim 1, wherein said ocular scan unit further comprises:
an optical system for focusing light reflected from said user's eye onto said imager.

3. The personal display system of claim 2 wherein said optical system comprises a beam splitter for reflecting light from said user's eye to said imager.

4. The personal display system of claim 2 wherein said optical system comprises a lens for focusing light onto said imager.

5. The personal display system of claim 2 wherein said display surface comprises a light emitting diode.

6. The personal display system of claim 5 wherein said display surface further comprises said imager.

7. The personal display system of claim 6 wherein said imager comprises active pixels.

8. The personal display system of claim 2 wherein said display surface comprises a liquid crystal display.

9. The personal display system of claim 2 wherein said display surface comprises an optical lens.

10. The personal display system of claim 2 further comprising a projector for projecting imagery onto said display surface.

11. The personal display system of claim 1 further comprising an interface unit for exchanging data with a connected system via a wireless communication link.

12. The personal display system of claim 11 wherein said connected system comprises a real world simulation device.

13. The personal display system of claim 3 wherein said connected system comprises a security access clearance device.

14. The personal display system of claim 3 wherein said display surface comprises a surface of an optical lens, wherein the logic for projecting comprises an image projector configured to project imagery onto the display surface, wherein content of the imagery is generated by the connected system and is communicated to the personal display system via the wireless communication link, and wherein content of the imagery is responsive to the ocular scan unit.

15. A method of providing identification-dependent data to a user comprising:
reflecting light from a user's eye;
generating a scan signal in response to light reflected from said eye;
evaluating the scan signal to identify the user; and
displaying to the user information that is dependent upon the identified user, wherein the information is displayed to the user on a transparent display surface as overlayed with objects viewable by the user through the display surface.

16. The method of claim 15, further comprising transmitting identification data to a connected system.

17. A personal display system, comprising:
a headset having a transparent optical display surface to be located in front of a user's eyes when the headset is positioned on the user's head;
means for displaying visual information to a user on the optical display surface;
means for supporting said means for displaying in relation to the user;
means for scanning of said user's eye and generating a scan image;
means responsive to the means for scanning for evaluating the scan image to identify the user; and
means responsive to the means for evaluating to generate user-dependent display information for displaying on the optical display surface as overlayed with objects viewable by the user through the display surface.

18. A personal display system according to claim 17 wherein said means for displaying comprises a liquid crystal display.

19. A personal display system according to claim 17 wherein said means for scanning said user's eye comprises active pixels comprised on organic light emitting diodes.

* * * * *